United States Patent [19]

Monsees et al.

[11] Patent Number: 5,179,773
[45] Date of Patent: Jan. 19, 1993

[54] PROCESS OF MANUFACTURING MULTILAYER CERAMIC CAPACITORS

[75] Inventors: John C. Monsees, Boulder, Colo.; Joseph W. Crownover, La Jolla; Aubrey M. Burer, El Cajon, both of Calif.

[73] Assignee: BMC Technology Corporation, San Diego, Calif.

[21] Appl. No.: 753,070

[22] Filed: Aug. 30, 1991

[51] Int. Cl.⁵ .............................. H01G 4/10
[52] U.S. Cl. .................. 29/25.42; 264/61; 427/81
[58] Field of Search ............ 29/25.42; 427/79-81; 264/61, 64

[56] References Cited

U.S. PATENT DOCUMENTS 4,882,651 11/1989 Maher ........................ 29/25.42 X
5,036,424 7/1991 Yokotani et al. ............. 29/25.42 X Primary Examiner—Carl E. Hall
Attorney, Agent, or Firm—Frank D. Gilliam

[57] ABSTRACT

A process of manufacturing thin monolithic multilayer capacitors having improved resistance to delamination. Basically, the process comprises the steps of providing a support sheet having registration indicia, such as a series of registration holes along the support edges, casting a substrate of ceramic particles in a resin binder onto the support, drying the substrate, forming thin electrodes in selected patterns by cathode sputtering, casting an additional substrate on the electrode surface in a vacuum, repeating the drying, electrode formation steps a selected number of times and forming a cover layer of substrate material over the final electrode. Individual capacitors may be cut from the multilayer product in any desired shape using any desired cutting technique. Ordinarily, the electrodes are formed in two alternating patterns in registration on succeeding layers. This process produces thinner multilayer capacitors with improved bonding between succeeding layers so as to increase resistance to delamination during cutting and use.

22 Claims, 2 Drawing Sheets

PROCESS OF MANUFACTURING MULTILAYER CERAMIC CAPACITORS

BACKGROUND OF THE INVENTION

This invention relates in general to the manufacture of multilayer capacitors and, more specifically, to improved methods of manufacturing multilayer capacitors with improved interlayer bonding.

Conventional multilayer capacitors generally consist of a number of alternate layers of conductive metal electrodes and dielectric layers, all connected in parallel so as to provide an increase in the electrical capacitance for a given area. This structure is generally referred to as a monolithic construction of electrodes and dielectrics or as a monolithic capacitor. The dielectric may be an insulating synthetic resin, a ceramic material or other insulator. A variety of conducting materials, typically metals, may be used in the electrodes.

At the present time, the electrodes are generally formed on a dielectric substrate through a "silk screen" printing process in which a type of printing ink comprising finely divided precious metal particles (typically having diameters of about 1 micrometer) dispersed in a resinous carrier are forced through a screen stencil onto the substrate. Because of the particulate nature of the conductor and the non-conductive resin matrix, the resulting layer does not have an optimum high conductivity. As the layer is made thinner than about 0.001 conductivity decreases to an undesirable degree becoming unusable below about 0.0006 inch. The decrease in conductivity beyond the linear decrease due to thinner deposits, is basically due to two effects, (1) roughness of the surface of the ceramic substrate absorbs approximately 30% of the metal contained in the 0.0006 inch wet deposition in filling in the roughness before any appreciable conductivity takes place and (2) the conductivity of the final form of a silk screened electrode is effectively the same as that of highly compacted metallic powder which in general exhibits considerably less conductivity than solid metal. These effects severely limit conductivity of thinner layers than 0.0006 inch of metallic particle ink electrodes.

While silk screening remains the customary method of fabricating multilayer capacitors, attempts have been made to use other methods for applying a conductive layer to form the electrodes.

As described by Behn et al. in U.S. Pat. No. 4,376,329, simple capacitors have been made by vapor deposition of a metal such as aluminum onto a substrate, followed by forming a layer of synthetic resin by gas polymerization, then vapor depositing another metal layer. This method is complex and cannot effectively produce multilayer ceramic capacitors comprising alternate layers of metal and ceramic dielectrics at high rates.

Another method of producing laminated capacitors is described by Behn in U.S. Pat. Nos. 4,378,382 and 4,508,049. Here, carriers are located in recesses in a drum, which is rotated to move the carriers alternately through vacuum chambers which deposit a metal such as aluminum, then a synthetic resin dielectric, by vacuum deposition. This is another complex system, requiring complex seals where the drum enters and leaves the vacuum chambers. This method does not seem adaptable to ceramic dielectrics and precious metal electrodes in systems for multilayer ceramic capacitors.

Glow discharge sputtering deposition facilitates a greater degree of conductivity for a given thickness of metal, thus allowing the use of thinner electrodes and thinner dielectric substrates. However, it has been found that sputtering of electrodes directly onto a substrate made up of ceramic particles and a resinous binder must be carried out at a very slow rate to avoid overheating the ceramic substrate. This heating is derived from the plasma which is a function of the sputtering system. Over heating of the ceramic/resin substrate inhibits the laminating process in which many ceramic substrates bearing sputtered electrodes are pressed together to form interlaminated metallic electrode and ceramic substrate sandwiches. Higher sputtering rates do not otherwise damage the substrate, but do prevent effective lamination.

Thus, there is a continuing need for methods of producing high temperature resistant multilayer capacitors using thin ceramic dielectric substrates and thin precious metal electrodes well laminated together to form monolithic capacitors.

SUMMARY OF THE INVENTION

It is, therefore an object of this invention to provide a method of making multilayer capacitors using thinner substrates and electrodes that are well laminated together. Another object is to provide a method of making multilayer capacitors in which electrodes are formed by cathode sputtering at high rates without adversely affecting lamination into multilayer capacitors.

The above objects, and others, are accomplished in accordance with this invention by a method which comprises the steps of casting an initial ceramic/resin substrate on a suitable support system, typically in long continuous rolls, having registration means, drying the substrate, sputtering a first metal electrode layer onto the substrate through an appropriate stencil, repeating the casting, drying and sputtering steps with each succeeding ceramic/resin substrate cast on the last-formed metal electrode layer, while maintaining the metal electrodes in substantially exact registration, repeating the casting, drying and sputtering steps as many times as desired (typically in long continuous rolls), and finally casting a cover ceramic/resin substrate over the final metal electrode layer. This may partially limit the need for mechanical stacking and laminating under pressure and heat as used in the prior art.

In order to improve bonding the substrate casting operations after formation of the initial substrate could be accomplished in a low vacuum, generally from about $-1$ to $-1.5$ mmHg and optimally at least about $-1.25$ mmHg in order to remove air bubbles. Vibrating of the substrate can also be used to help eliminate bubbles.

The resulting multilayer capacitor preform may then be punched to form individual capacitor bars, the bars may be cut into individual capacitors of selected configuration and the capacitors may be fired in a conventional manner. The final capacitors have thin substrates and electrodes forming a very well bonded laminated monolithic capacitor. Production time is greatly reduced, since sputtering rates several times faster than those possible with prior methods may be used.

A preferred overall process and apparatus and preferred materials and arrangements are provided in our copending U.S. patent application, Ser. No. 07/610,780, filed Nov. 8, 1990, the disclosure of which is incorporated herein by reference.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
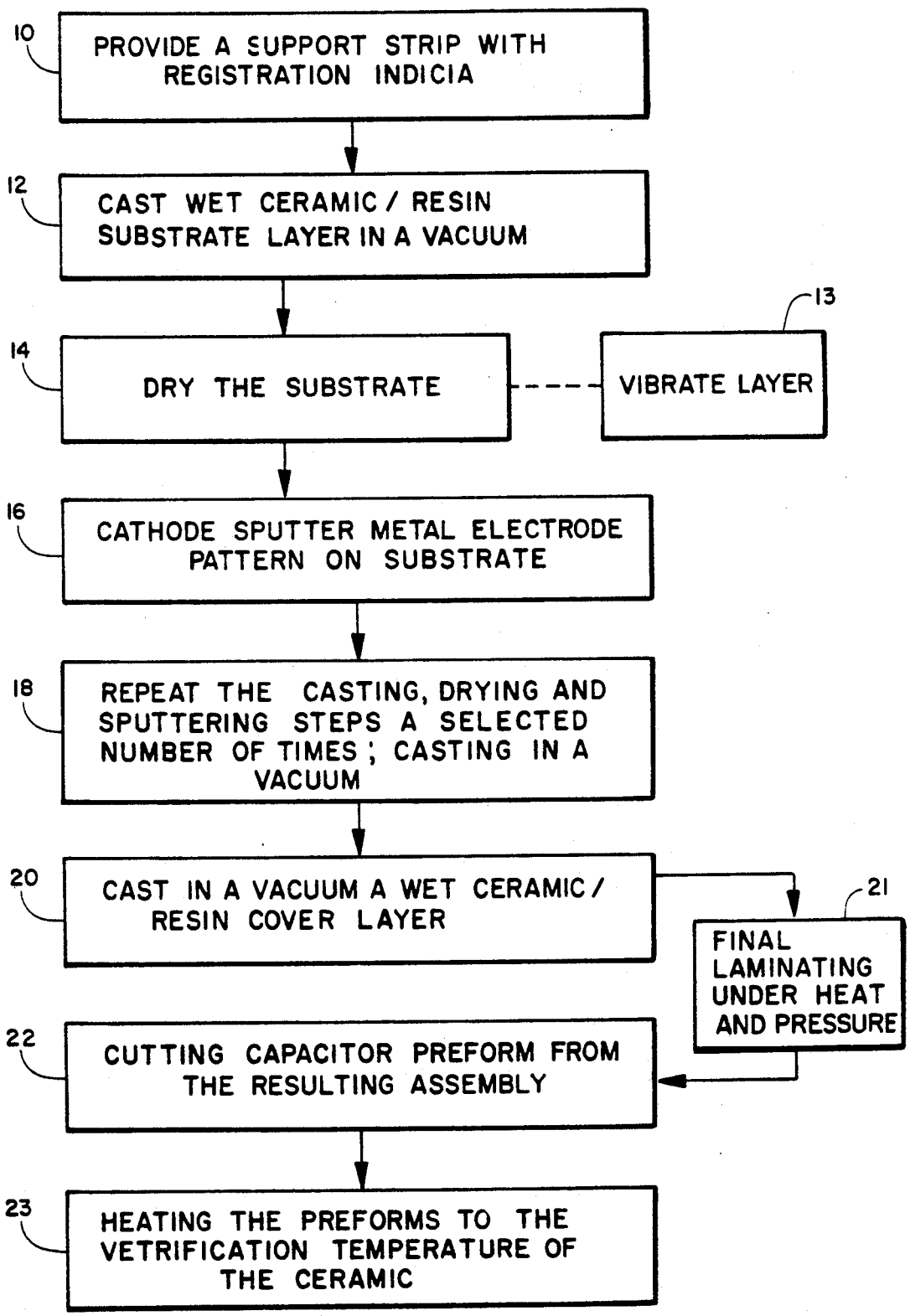
FIG. 1 is a flow diagram of the basic process of this invention.

The basic process of manufacturing multilayer capacitors is outlined in the block diagram of FIG. 1. Initially, a roll of support material is provided, as indicated in block 10. the support material may be any suitable thin sheet material, such as paper or plastic film. Excellent results are obtained with paper, Kapton aramid or other films having the desired flexibility, toughness and resistance to the temperatures involved in this process. Registration indicia are provided on the support to allow substantially exact registration of the support with a stencil used to apply multiple electrodes to substrates formed on the support, as detailed below. Preferably, the indicia is in the form of uniformly spaced pin holes along the edges of the support, similar to motion picture film registration holes, to be engaged by pins on the support moving means. If desired, other registration means could be used, such as regularly spaced edge markings to be read by an optical scanning system.

The second step, as indicated in block 12 in this process is casting a wet mixture of finely divided ceramic particles in a resin matrix to the desired thickness on the support. This green ceramic layer preferably comprises finely divided dielectric ceramic particles, typically formed from oxides of metals such as barium, strontium, titanium or mixtures thereof, having average diameters of from about 0.5 to 2.0 micrometers dispersed in a resin matrix in a weight ratio of typically about 50 wt % resin and solvent and 50 wt % ceramic particles. Typical resins include vinyl polymers and acrylic polymers, typically plasticized with toluene or ethanol solvents. Other resins may be used, dissolved in water or suitable organic solvents, as desired. The resinous material typically comprises about 20 wt % resin and about 80 wt % solvent and has a consistency similar to that of conventional house paint. The ceramic/resin mixture is typically slip cast to a selected wet thickness.

In the third step, as indicated in block 14, the cast substrate layer is partially dried by heating at a temperature of about 100° to 150° F. for from about 10 to 15 minutes to remove most of the solvent and leave a partially dry, easily handled, reasonably sturdy layer on the support.

As indicated in the step indicated in block 16, a suitable electrode pattern is formed by cathode sputtering through a stencil which is aligned with the support indicia, typically perforated in the desired pattern to receive pins which extend through indica pinholes in the support and stencil. Any metal that falls on the stencil will be later removed for reuse. As mentioned above, a variety of metals may be applied, including many metals that are not suitable for the prior art silk screen techniques.

Next, in the step indicated in block 16, the casting, drying and sputtering steps are repeated a selected number of times to form a multilayer capacitor. Generally, successive layers may have different electrode patterns, typically alternating between two patterns as detailed below. Each succeeding layer of the ceramic/resin mixture used is cast in a mild vacuum over the electrode bearing surface. If cast at normal atmospheric pressure, we have found that small air pockets are trapped in the rough surface of the dried layer by the over coating as detailed below. These air pockets may cause later problems, such as delamination and low strength, if allowed to remain. By casting the over layer in a low vacuum, typically from about −1 to −1.5 mmHg, these air pockets can be eliminated.

As discussed above, laminating two dried substrates together often results in a poor bond and later delamination problems, apparently due to the dried resin surfaces which do not bond well when simply pressed together. The use of a wet second layer appears to sufficiently wet and slightly dissolve and restore the dry resin surface on the underneath layer to assure an excellent bond.

Once the desired number of layers are formed, a final cover layer of the ceramic/resin mixture is cast on the stack and dried, as shown in block 20. In order to assure that all of the layers making up the stack are in tight contact and are well bonded, it is preferred that pressure be applied to the stack, as indicated in block 21. Pressure may be applied in any suitable manner, such as pressing with a platen or rolling with a resilient roller, as desired.

The stack may then be punched or cut to form individual capacitors, which may then be dried and fired in any suitable manner and have contacts added and be encapsulated in any suitable housing, as desired.

Figure 2:
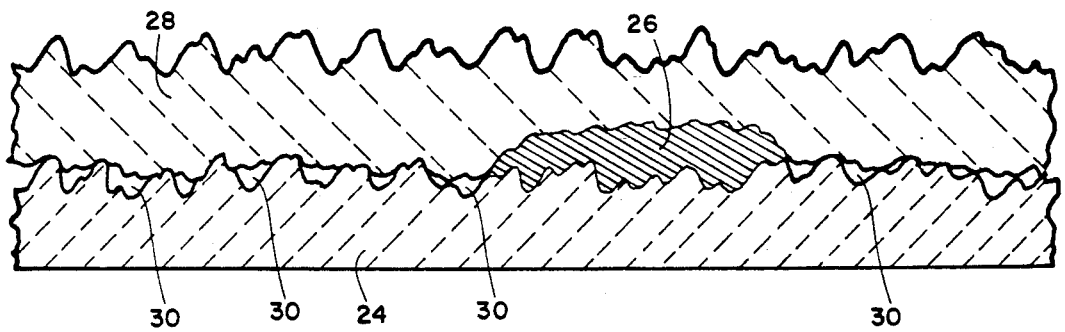
FIG. 2 is a schematic vertical section through a multilayer capacitor made without use of a vacuum.

FIG. 2 illustrates in a vertical section through a two layer assembly the reasons why the use of a low vacuum in casting succeeding ceramic/resin layers is so advantageous. Here, initial substrate layer 24 has the usual slightly rough upper surface resulting from the ceramic particles. The sputtered electrode layer 26 fills this roughness and provides a smooth upper surface. When a ceramic/resin mixture 28 is flooded across the first substrate to form a second substrate layer, air pockets 30 are likely to remain, preventing complete contact and most effective bonding between the two substrate layers. Where the lower layer has been dried, contact with the resin and solvent in the second layer is important to obtain maximum bonding between the substrates. A slight vacuum will cause the air pockets to outgas as small bubbles that pass through the second substrate 28. While the surface of second substrate 28 will be slightly irregular just after the casting step, the surface smoothes out during the initial stages of the drying step. Although the bonding surfaces obtained without a vacuum or vibrating may be acceptable in some cases, the use of the described vacuum and or vibration of the material is preferred for optimum product quality.

Figure 3:
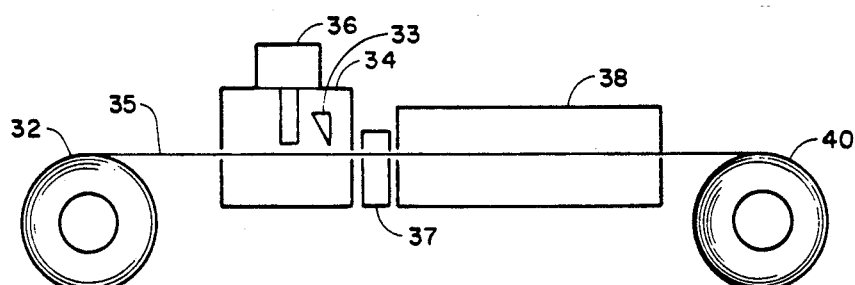
FIG. 3 is a schematic side view of the substrate layer manufacturing steps.

The sequence of casting succeeding ceramic/resin layers on the preceding layers is schematically illustrated in FIG. 3. The support strip 35 with one or more sets of cast substrate and sputtered electrode is rolled up on a supply roll. When the support film carrying a plurality of layers is rolled, the upper portions of the layers will stretch slightly, due to the increasing circumference of the supply roll. For some capacitors, the overall thickness of the product may be as much as about 0.04 inch. We have found that for best results, the core of roll 32 should preferably have a diameter of at least about 24 inches to assure that this slight deformation of the capacitors is not sufficient to cause problems. With a 24 inch roll core, the differential between the bottom and top of a standard capacitor will not exceed about 0.0005 inch. Smaller diameter roller cores may, of course, be used with thinner capacitors without significant problems.

The support strip 35 bearing one or more layers of dried substrate and electrode passes into a vacuum chamber 34 where a casting device 36 applies the next layer of ceramic/resin mixture and a conventional leveling devices smoothes the wet layer to the desired thickness. The support strip 35 then passes through a vibrator 37 and through a drying oven 38 and to a take-up roller 40.

Figure 4:
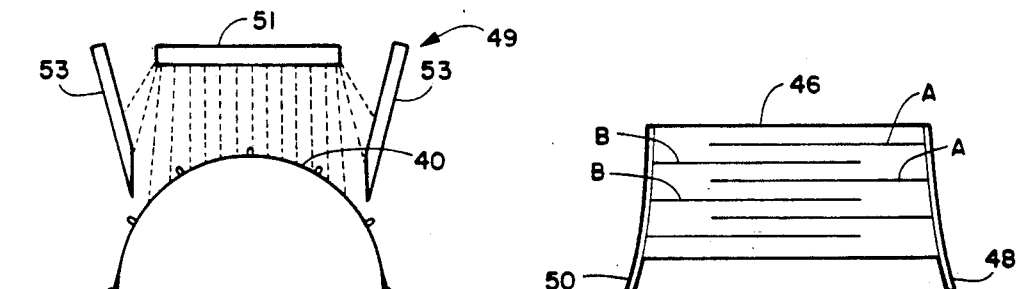
FIG. 4 is a schematic side view of the cathode sputtering system.

The support then is moved to the sputtering station schematically illustrated in FIG. 4, where the electrode pattern is applied. In FIG. 4, there is seen an apparatus for forming metal electrode coatings onto a green ceramic substrate coated on strip 35. Strip 35 is fed from a supply roll 37, through the apparatus to a take-up roll 39. Typically, these rolls 37 and 39 should have diameters of about 24 inches. Strip 35 is passed around drum 41 between the supply and takeup rolls. A series of registration holes (not seen) are provided along the edges of the strip which engage registration pins 43. Drum 41 is rotated at a selected speed by a conventional drive means, not shown, which withdraws strip 35 from supply roll 37. Take-up roll 39 is also rotated to smoothly take up strip leaving drum 41.

A continuous stencil web 45 is entrained around drum 35 and two idler rolls 47. Registration holes are provided along the edges of stencil web 45, corresponding to the edge holes along the edges of strip 35 and registration pins 43 on drum 41. The registration holes serve to drive the web in the loop around drum 41 and to maintain precise registration between stencil web 45 and strip 35. Stencil web 45 has a pattern of stencil apertures corresponding to the desired electrodes to be formed on the ceramic substrate. Typically, where web 45 has a width of about 5 inches, 40 rows of stencil apertures may be provided. Of course, wider or narrower webs with more or fewer rows of apertures may be used, as desired.

A sputtering chamber, generally designated 28, is located adjacent to drum 41 opposite the sandwich of the ceramic substrate layer on strip 35 and stencil web 45. The entire apparatus, which may typically have an overall width of about 21 inches and height of about 36 inches, may be enclosed in a conventional vacuum vessel (not shown). Typically, the vessel is evacuated to a pressure of from about $5 \times 10^{-4}$ to $5 \times 10^{-9}$ mmHg, then backfilled with an inert gas such as argon at a pressure of from about $10^{-2}$ to $10^{-4}$ mmHg and maintained in that pressure range.

Chamber 49 basically includes a sputtering target 51 from which metal atoms are propelled toward the sandwich on drum 41 in a conventional manner and shields 53 which collects sputtered atoms that miss the sandwitch and makes scrap recovery easier. Any suitable sputtering system of the many well known in the art may be used.

Sputtering is the rather graphic term describing the process of disintegrating a solid surface by bombarding ions accelerated toward the surface by a high voltage. The momentum of the impacting ions is transferred to the surface atoms, ejecting them with fairly high velocities of their own. The ejected atoms are here deposited on the ceramic substrate in the stencil openings 26 and on the stencil itself between openings. A thin film is thus deposited atom-by-atom. Since sputtering is a non-evaporative process, high melting point materials can be deposited. In the present case, the sputtered metals must have melting points sufficiently high to avoid any damage to the electrodes during later firings of the green ceramic substrate which may require temperatures well above 1000° C. It is also possible with sputtering to transfer an alloy from the target to the substrate without changing the alloy composition.

In the past, sputtering was a relatively slow process. With diode systems, deposition was limited to about 200 to 500 Angstroms per minute. We have found that with "planar magnetron" sputtering relatively thick films can be formed at acceptable rates, since deposition rates as high as 20,000 angstroms per minute are possible. Thus, we prefer to use a conventional planar magnetron system to produce the flow of metal atoms from target 51 to the surface of the stencil web 45 and ceramic substrate 35 through the stencil openings. A layer of metal will build up on web 45, eventually limiting its flexibility. The web is then replaced and the metal coating recovered from the web.

Since the green ceramic comprises ceramic particles in a resin matrix, high temperatures during sputtering can damage the green ceramic surface. Significant thermal energy is emitted by target 51 during sputtering. As discussed above, the excessive thermal energy applied to the green ceramic layer can prevent good adhesion when attempts are made to laminate dry layers together by pressure alone. This problem is overcome by our process of casting the successive paint-like layers on preceding partially dry layers.

While the drum arrangement shown is strongly preferred for simplicity, convenience and effectiveness, other curved surfaces providing a similar effect of gradually introducing the substrate to the full sputtering may be used, if desired. Tracked belts bearing registration pins could be used to move the sandwich of strip and web over such a surface.

Figure 6:
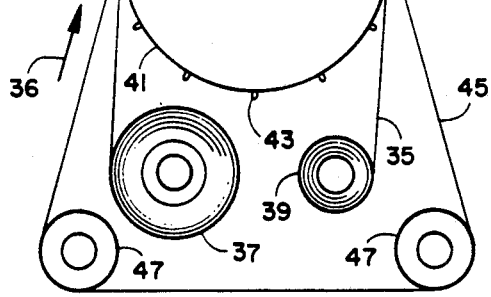
FIG. 6 is a schematic vertical section view a multilayer capacitor made by the process of this invention.
Figure 5:
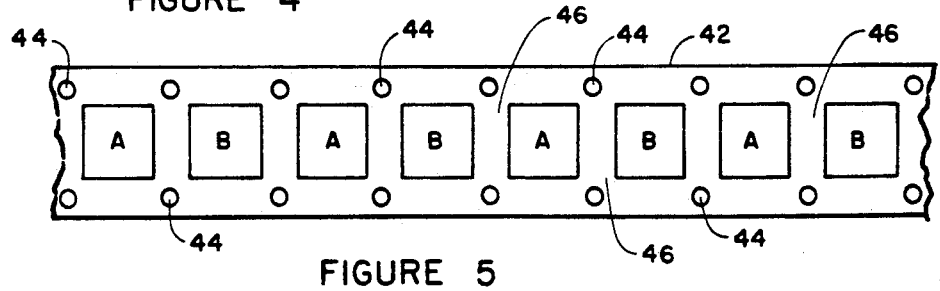
FIG. 5 is a schematic plan view showing the support with electrodes in two patterns thereon.

FIG. 5 shows a typical support layer 42 having registration holes 44 along the edges and bearing a dried ceramic/resin layer 46 and a series of electrode patterns, here alternating between two patterns identified as "A" and "B". When this substrate is again passed through the ceramic/resin substrate casting step, drying step and electrode sputtering steps, pattern "B" will be formed over those having the "A" pattern and pattern "A" will be formed over previous "B" patterns. When the final capacitor 46 as seen in FIG. 6 is cut from the support 42 in a selected shape, a typical configuration such as is shown in the vertical section view will generally be produced. Patterns "A" will have electrodes extending to one edge, while patterns "B" will extend to the opposite edge. Thus, conductors schematically indicated at 48 and 50 can run down opposite sides of the capacitor to contact the electrodes to form a parallel sequence of electrodes. Other suitable sequences of patterns may be produced as desired. Of course a variety of other patterns could be used as desired, such as a succession of identical patterns (e.g. A-A-A-A or B-B-B-B) or other alternating patterns (e.g. A-B-A-B-A-B, etc.).

Other applications, variations and ramifications of this invention will occur to those skilled in the art upon reading this disclosure. Those are intended to be included within the scope of this invention, as defined in the appended claims.

We claim:

1. The process of making thin monolithic multiplayer capacitors which comprises the steps of:
   providing a support strip bearing registration indicia;
   casting a substrate layer on said support strip from a mixture of finely divided ceramic particles in a wet resin and solvent matrix;
   drying said substrate layer;
   forming selected electrode patterns by cathode sputtering through a stencil in accordance with said indicia;
   repeating said casting, drying and sputtering steps at least one additional time; and
   casting a cover layer of ceramic particles in a wet resin and solvent matrix over the final sputtering step.

2. The process according to claim 1 including the further steps of drying said cover layer, cutting selected capacitor preforms from the resulting assembly and heating the resulting capacitor preforms to the vitrification temperature of said ceramic particles.

3. The process according to claim 1 wherein said casting of said layers of ceramic particles in said matrix is accomplished in a vacuum.

4. The process according to claim 3 wherein said vacuum is maintained at from about −1 to −1.5 mmHg during said casting.

5. The process according to claim 1 wherein said substrate is at least partially dried at a temperature of from about 100° to 150° F. for from about 10 to 15 minutes.

6. The process according to claim 1 wherein said ceramic particles are formed from oxides of barium, titanium, strontium and mixtures thereof and have average particle diameters in the 0.5 to 2.0 micrometer range.

7. The process according to claim 1 wherein said wet resin matrix comprises about 20 wt % resin and about 80 wt % solvent.

8. The process according to claim 7 wherein said resin is selected from the group consisting of vinyl and acrylic polymers and mixtures thereof and said solvent is selected from the group consisting of toluene, ethanol and mixtures thereof.

9. The process according to claim 1 wherein said electrodes are formed from metals having melting points above about 1200° F.

10. The process according to claim 9 wherein said electrodes are formed from metals selected from the group consisting of palladium, silver and alloys thereof.

11. The process according to claim 1 wherein after each substrate drying step the strip is rolled up on a core having a diameter of at least about 24 inches prior to the sputtering step.

12. The process according to claim 1 wherein said cast layer is subjected to vibration prior to drying.

13. The process of making thin monolithic multilayer capacitors which comprises the steps of:
    providing a support strip bearing registration indicia;
    casting a substrate layer on said support strip from a mixture of finely divided ceramic particles in a wet resin and solvent matrix;
    maintaining said substrate in a vacuum during said casting step;
    drying said substrate layer;
    forming selected electrode patterns by cathode sputtering through a stencil in accordance with said indicia;
    repeating said casting, drying and sputtering steps at least one additional time;
    casting a cover layer of ceramic particles in a wet resin and solvent matrix over the final sputtering step;
    cutting capacitor preforms from the resulting assembly; and
    heating said preforms to the vitrification temperature of said ceramic particles.

14. The process according to claim 13 wherein said vacuum is maintained at from about −1 to −1.5 mmHg during said casting.

15. The process according to claim 13 wherein said substrate is dried at a temperature of from about 100° to 150° F. for from about 10 to 15 minutes.

16. The process according to claim 13 wherein said ceramic particles are formed from oxides of barium, titanium, strontium and mixtures thereof and have average particle diameters in the 0.5 to 2.0 micrometer range.

17. The process according to claim 13 wherein said wet resin matrix comprises about 20 wt % resin and about 80 wt % solvent.

18. The process according to claim 17 wherein said resin is selected from the group consisting of vinyl and acrylic polymers and mixtures thereof and said solvent is selected from the group consisting of toluene, ethanol and mixtures thereof.

19. The process according to claim 13 wherein said electrodes are formed from metals having melting points above about 1200° F.

20. The process according to claim 19 wherein said electrodes are formed from metals selected from the group consisting of palladium, silver and alloys thereof.

21. The process according to claim 13 wherein after each substrate drying step the strip is rolled up on a core having a diameter of at least about 24 inches prior to the sputtering step.

22. The process according to claim 13 wherein said cast layer is subjected to vibration prior to drying.

* * * * *